Aug. 4, 1953  C. WEAVER  2,647,835
LIGHT-SENSITIVE PHOTOGRAPHIC ELEMENT AND PROCESS OF COATING
Filed Sept. 29, 1948

FIG. 1.

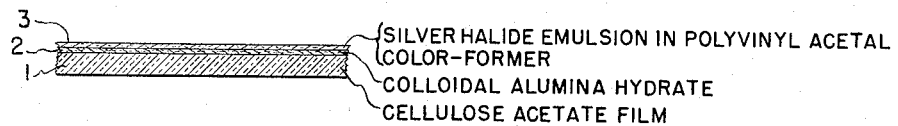

3 — SILVER HALIDE EMULSION IN POLYVINYL ACETAL
2 — COLOR-FORMER
1 — COLLOIDAL ALUMINA HYDRATE
— CELLULOSE ACETATE FILM

FIG. 2.

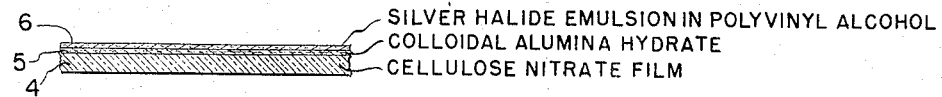

6 — SILVER HALIDE EMULSION IN POLYVINYL ALCOHOL
5 — COLLOIDAL ALUMINA HYDRATE
4 — CELLULOSE NITRATE FILM

FIG. 3.

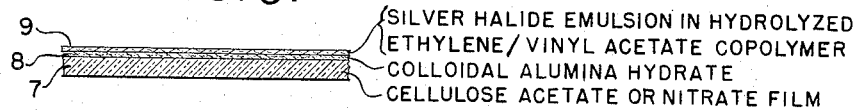

9 — SILVER HALIDE EMULSION IN HYDROLYZED ETHYLENE/VINYL ACETATE COPOLYMER
8 — COLLOIDAL ALUMINA HYDRATE
7 — CELLULOSE ACETATE OR NITRATE FILM

FIG. 4.

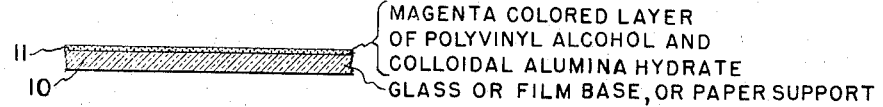

11 — MAGENTA COLORED LAYER OF POLYVINYL ALCOHOL AND COLLOIDAL ALUMINA HYDRATE
10 — GLASS OR FILM BASE, OR PAPER SUPPORT

INVENTOR.
CLAY WEAVER
BY
Lynn Barratt Morris
ATTORNEY.

Patented Aug. 4, 1953

2,647,835

UNITED STATES PATENT OFFICE 2,647,835

LIGHT-SENSITIVE PHOTOGRAPHIC ELEMENT AND PROCESS OF COATING

Clay Weaver, Wilmington, Del., assignor to E. I. du Pont de Nemours & Company, Wilmington, Del., a corporation of Delaware Application September 29, 1948, Serial No. 51,851

9 Claims. (Cl. 95—8)

This invention relates to photography and more particularly to a process for coating layers containing synthetic hydroxyl polymers having a plurality of recurring intralinear

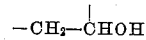

groups. Still more particularly it relates to a process of gelling synthetic hydroxyl polymer silver halide emulsions and emulsion layers with colloidal alumina hydrate. It also relates to photographic elements bearing gelled layers of synthetic hydroxyl polymer silver halide emulsions.

Synthetic hydroxyl polymers having a plurality of recurring intralinear

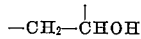

groups which form clear, hard, transparent, thin films and which are water-soluble or hydrophilic in character have been proposed as the binding agents in photographic elements for silver halides, anti-halation dyes and pigments, filter dyes, etc. These hydroxyl polymers, however, do not set or gel like gelatin upon chilling or lowering of temperature and hence present some problems in high-speed coating of a film base.

An object of this invention is to provide a new and practical process for coating thin layers of synthetic hydroxyl polymers of the foregoing type. Another object is to provide such a process which is simple and economical and which utilizes commercially available materials. A further object is to provide such a process which does not deleteriously affect light-sensitive silver halide dispersions in such hydroxyl polymers. A still further object is to provide a rapid and effective process for gelling light-sensitive silver halide dispersions in hydroxyl polymers of the above type. Yet another object is to provide new and improved photographic elements which have colloidal alumina hydrate in contact with the hydroxyl polymer layers of such elements. Still other objects will be apparent from the following description of the invention.

It has been found that if transparent colloidal alumina hydrate is brought into contact with an aqueous solution or dispersion of a synthetic hydroxyl polymer having a plurality of recurring intralinear vinyl alcohol

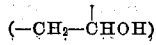

groups as polymer forming units, the hydroxyl polymer solutions have improved gelling characteristics and other advantages. The aqueous solution or dispersion of the synthetic hydroxyl polymer must have a pH at least as high as 6, and preferably has a pH of 7 or higher, in order to benefit from the gelling action of the colloidal alumina hydrate.

The colloidal alumina hydrate may be admixed with the aqueous solution or dispersion of the hydroxyl polymer and the resulting solution coated onto a suitable support, or the colloidal alumina hydrate may be coated onto a suitable support and the aqueous solution of the hydroxyl polymer brought into contact with the colloidal alumina hydrate by coating it on the layer of such hydrate.

In one important embodiment of the invention a flexible support such as a photographic paper or film base is first coated with a thin, transparent layer of colloidal alumina hydrate from a solution or dispersion in a volatile organic solvent, e. g., methanol. An aqueous silver halide emulsion or dispersion in a water-soluble to hydrophilic synthetic hydroxyl polymer having a pH of 7 or greater is then coated onto the layer of colloidal alumina hydrate. The latter material causes the silver halide emulsion to gel or set at a fairly rapid rate. After drying, the coating is smooth, hard, uniform and of excellent quality for photographic use.

In another embodiment of this invention, transparent colloidal alumina hydrate is uniformly mixed with an unexposed, light-sensitive silver halide emulsion in a synthetic hydroxyl polymer binder of the foregoing type and the mixture is coated shortly after mixing on a suitable support, such as paper or a transparent film base, and the light-sensitive layer thus prepared is dried. When this film is photographically exposed to an object and the exposed, light-sensitive silver halide is developed with a color-developing solution containing a suitable color former capable of forming a quinoneimine or azomethine dye and the film after development is processed by the usual fixing, bleaching, and washing procedures, a dye image is formed which shows no tendency to diffuse even when subjected to extremely long washing periods.

In a further embodiment of this invention a photographic element is prepared in which one layer contains the synthetic hydroxyl binder, colloidal alumina hydrate, and a dye.

The invention can be applied to synthetic hydroxyl polymer-silver halide dispersions in general wherein the hydroxyl polymer contains a plurality of recurring

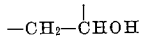

groups as polymer forming units and is water-soluble to hydrophilic and forms hard, thin, flexible films. Such polymers include polyvinyl alcohol, its partially hydrolyzed lower fatty acid esters, lower alkyl ethers, lower acetals, and acetals with aldehydes which contain color former nuclei. Polyvinyl alcohol is a tough, transparent, polymeric, film-forming, water-soluble material. The more highly polymerized varieties are soluble only in hot water and the medium or lower polymers are soluble in cold water. They are usually prepared by hydrolysis of polyvinyl esters, such as polyvinyl acetate, polyvinyl chloracetate, polyvinyl isobutyrate, etc. The partly hydrolyzed esters which contain a large number of recurring vinyl alcohol units

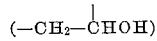

are water-soluble in character. The ethers can be made by incompletely etherifying the completely or partially hydrolyzed polyvinyl acetate, etc. The polyvinyl acetals, e. g., polyvinyl acetaldehyde acetal and polyvinyl isobutyral, can be made by acetalization of polyvinyl alcohol and its incompletely hydrolyzed carboxylic acid esters.

In addition to the water-soluble and hydrophilic synthetic hydroxyl polymers just described, there may be mentioned partially and completely hydrolyzed polyvinyl esters, e. g., vinyl acetate and copolymers thereof with ethylenically unsaturated compounds, such as vinyl chloride and styrene; acrylic acid esters, e. g., methyl acrylate; methacrylic acid esters, e. g., methyl methacrylate; and mono-olefines, e. g., ethylene. The completely hydrolyzed ethylene/vinyl acetate copolymer emulsion described in U. S. Patent 2,397,866 and U. S. Patent 2,386,347 form an important class of silver halide emulsions which can advantageously be coated by the improved methods of this invention. These polymers may contain color-former nuclei. Suitable polymers of this latter type are described in U. S. Patents 2,310,943, 2,320,422, 2,397,865 and 2,415,381.

The colloidal alumina hydrate used in the process of this invention can be prepared in accordance with the procedure of U. S. Patent 2,085,129. In a preferred process described in copending application Serial No. 28,277 filed May 20, 1948, now U. S. Patent 2,590,833, colloidal alumina hydrate is prepared from aluminum chloride by reaction with ammonium hydroxide, followed by removal of excess ammonium chloride by washing or dialysis, heating the precipitate in presence of the small amount of chloride not removed in washing, and subjecting the colloidal material to strong shearing forces to produce particles of extremely small size. By this procedure, the average size of all particles of colloidal alumina hydrate obtained is 30–60 millimicrons in their greatest axial dimension.

The alumina sols are composed of positively charged particles of highly hydrated alumina. The average particle size is in the range of 30–60 millimicrons in diameter. Evidence from X-ray diffraction indicates that both the monohydrate and trihydrate forms of aluminum oxide may be present.

When the colloidal alumina hydrate is coated directly on a film support, it is generally applied in an aqueous solution of a lower volatile alkanol, e. g., methanol and ethanol, containing 0.1–10% by weight of colloidal alumina hydrate. This results in a thin, transparent form of colloidal alumina being deposited on the film base. Usually from 1–3% colloidal alumina hydrate in aqueous solution containing an excess of methanol over water gives the best results. The colloidal alumina hydrate coating is then dried and the light-sensitive emulsion in the synthetic hydroxyl polymer is then applied. When the colloidal alumina hydrate is mixed with the light-sensitive silver halide emulsion, from 0.1 to 10% by weight of alumina, based on the solid content of the emulsion, is used in an aqueous methanol or ethanol solution.

To effect gelling action, the pH of the synthetic hydroxyl polymer solution must be at least 6 and is preferably 7 or higher; i. e., the solution is preferably neutral or alkaline. Ammonia, water-soluble amines, such as ethylamine, diethylamine, ethanolamine, triethanolamine, etc., or water-soluble alkalies such as alkali metal hydroxides, carbonates or bicarbonates, e. g., sodium carbonate, potassium bicarbonate, etc., can be present in amount sufficient to produce a pH of 7–10 or greater. Usually a pH of 7–9 is the most desirable range.

The invention is further illustrated by the following examples in which parts are by weight.

*Example I*

To 80 parts of colloidal alumina hydrate sol (5.48% solids) containing particles of such hydrate having an average size of 30 to 60 millimicrons in their greatest axial dimension there is added 100 parts of methanol. The resulting colloidal solution is coated on a cellulose acetate film base, as shown in Fig. 1 of the drawing and dried. A photographic silver halide emulsion, having as the colloid binder the polyvinyl acetal of m-(3-methyl-salicylamido)-benzaldehyde prepared as described in Example II of application Serial No. 19,155 filed April 5, 1948, now U. S. Patent 2,489,655, and having a pH of 8–9, is coated on the layer 2 of colloidal alumina hydrate. Gelation of the emulsion coat occurs through the action of the alumina hydrate on the colloid binder. The gelled silver halide emulsion coating 3 is then dried in warm air. The finished product is a smooth, homogeneous, light-sensitive photographic film which may be exposed, developed in a color-developing solution, and processed in the usual manner to yield a blue-green dye image which is substantially nondiffusing.

*Example II*

To 25 parts of 5% colloidal alumina hydrate sol is added 60 parts of methanol and the resulting mixture is deposited on a cellulose nitrate film base 4 as shown in Fig. 2 of the drawing to form a thin sublayer 5. An aqueous dispersion of light-sensitive silver halides in polyvinyl alcohol of medium viscosity and having a pH of 8–9 is coated on the sublayer to form light-sensitive layer 6 which is dried after the manner described in Example I.

*Example III*

Cellulose acetate and cellulose nitrate film bases 7 as shown in Fig. 3 of the drawing are provided with a thin layer 8 of colloidal alumina hydrate as described in Examples I and II, respectively, and a light-sensitive silver halide emulsion having a pH of 8 in which the colloid binder is a hydrolyzed ethylene/vinyl acetate interpolymer, having a mol ratio within the range of 0.3 to 0.02 of ethylene to 1.0 of vinyl acetate as described in U. S. Patent 2,397,866, is coated on the sublayer as described in Example I. The emulsion sets to a firm gel. It may then be dried to a smooth, homogeneous coating 9. When the films are exposed and developed in an ordinary p-methylaminophenol sulfate/hydroquinone developer, fixed, and washed, a black-and-white negative image results.

*Example IV*

Photographic film bases of cellulose acetate and cellulose nitrate are provided with a thin layer of colloidal alumina hydrate as described in Examples I and II and a photographic emulsion having a pH of 8 in which the colloid binder is polyvinyl alcohol of the type described in Example I of Schupp U. S. App. Ser. No. 670,521 filed May 17, 1946, now U. S. Patent 2,579,016, is coated on the respective sublayers. The emulsion gels through the action of the colloidal alumina hydrate and is dried to a uniform, smooth layer which may be processed to a black-and-white picture as described in Example III.

*Example V*

Transparent film bases of cellulose acetate and cellulose nitrate are provided with a thin sublayer of colloidal alumina hydrate as described in Examples I and II and are coated with a solution of a polyvinyl alcohol in water, or water containing 5-30% of ethanol, and having a pH of 7. Gelation of the polymeric layer occurs as described in Examples I and II so that the product may be dried to yield a clear, transparent film. A silver halide emulsion layer can be deposited on the gelled polyvinyl alcohol layer, if desired.

*Example VI*

To 130 parts of light-sensitive silver halide emulsion having a pH of 8-9 in which the colloid binder is the hydrolyzed ethylene/vinyl acetate interpolymer of Example III (described in U. S. 2,397,866), is added 13 parts of a 5% colloidal alumina hydrate sol and 25 parts of 20% ethanol. The emulsion is coated on a suitable support, such as paper or transparent film base, and dried. It is exposed and developed with a p-phenylenediamine color-developing solution containing a soluble color former. A suitable composition is as follows:

| | G. |
|---|---|
| Sodium sulfite (anhydrous) | 10 |
| Sodium carbonate (anhydrous) | 25 |
| p-Aminodiethylaniline hydrochloride | 2.5 |
| Potassium bromide | 2 |
| 1-(p-Carboxyphenyl)-3-methyl-5-pyrazolone | 2.5 |
| Water to make 1 liter | |

After development, the film is fixed, bleached, and washed, etc., in normal fashion, and a magenta-colored image is obtained in which the dye shows no tendency to diffuse even when subjected to extremely long washing periods.

*Example VII*

A solution is made of a hydroxyl-containing polymer and colloidal alumina hydrate and coated on a support 10 as shown in Fig. 4 of the drawing such as glass, paper, or a transparent film base material. For example, such a solution is made from 10 parts of the polyvinyl alcohol described in Example I of aforesaid Patent 2,579,016, 10 parts of ethanol, 80 parts of water, and 20 parts of 5% colloidal alumina hydrate sol. The coating 11 is dried and bathed in a solution of color developer and soluble color former such as that described in Example VI, rinsed, bathed in a 4% solution of potassium ferricyanide, and washed in running water. A uniformly magenta-colored film 11 is obtained from which the dye does not diffuse during a washing period of one hour or more.

*Example VIII*

The color former of Examples VI and VII is replaced by 1-hydroxy-2-naphthoic acid and blue-green-colored films are made wherein the dye does not diffuse even when subjected to washing periods of an hour.

*Example IX*

A film element consisting of colloidal alumina hydrate dispersed in a hydroxyl-containing polymer (same as Example VII) and coated on a transparent film base is bathed in a solution of 0.05 part of Ink Blue (Colour Index No. 707) in 50 parts of water. After 2-10 minutes the film is removed. It is blue-colored and the dye does not diffuse appreciably when washed in water.

Similarly, when the dye of Example IX is replaced by one of the following dyes dissolved in water or aqueous alcohol, the dyes do not diffuse appreciably when washed in water.

1. The green dye described in U. S. P. 2,095,077.
2. Naphthol Green B (Colour Index No. 5).
3. A Hansa Green dye such as described in German Patent 224,442.

*Example X*

A mixture of a synthetic hydroxyl polymer, colloidal alumina hydrate, and a dye is made and coated on a suitable photographic support to give a colored layer as follows: To 20 parts of a 10% polyvinyl alcohol solution, prepared from 10 parts of the polyvinyl alcohol described in Example I of aforesaid Patent 2,579,016, 10 parts of ethanol, and 80 parts of water is added 20 parts of water, 10 parts of 2% acetic acid, and 4 parts of 5% colloidal alumina hydrate sol of Example I. The mixture is vigorously agitated at 40-45° C. and one part of a 2% solution of Metanil Yellow (Colour Index No. 133) in water is added slowly. Vigorous agitation is continued until a homogeneous solution results (30-60 min.). The resulting dye solution is coated on a suitable support such as glass or transparent film base and dried to give a clear, yellow-colored film from which the dye shows no tendency to diffuse when bathed in water 2-5 min. A similar polyvinyl alcohol film containing Metanil Yellow and no colloidal alumina hydrate loses almost all its dye when bathed for 2 min. in water.

*Example XI*

The Metanil Yellow of Example X is replaced with one part of a 1% solution of Ink Blue (Colour Index No. 707) and a similar coating solution prepared. After vigorous agitation, the resulting blue solution is coated on a transparent film base to give a blue film in which the dye is nondiffusing.

When used as a sub for photographic film base, colloidal alumina hydrate can be diluted or mixed with up to equal parts by weight of an organic solvent soluble (e. g., methanol-soluble) synthetic hydroxyl polymer, for example, partially hydrolyzed polyvinyl acetate or partially hydrolyzed ethylene/vinyl acetate copolymers. The mixture can be applied in methanol, ethanol or acetone solution containing from 0.1 to 10% by weight of colloidal alumina hydrate. The colloidal alumina hydrate layers may be coated on each surface of the support, e. g., film base, paper, etc., and a hydroxyl polymer layer coated on each sublayer of said alumina.

The layers of colloidal alumina hydrate can be used to gel other types of photographic coatings beside silver halide emulsion layers. Thus, clear colloid layers, filter layers containing light-absorbing filter dyes, e. g., Tartarazine (Colour Index No. 640), Metanil Yellow (Colour Index No. 138), Ink Blue (Colour Index No. 707) or Yellow Colloidal Silver, and anti-halation layers utilizing synthetic hydroxyl polymers as the binding agents for the antihalation dye or pigment, for example, such as those disclosed in McQueen Ser. No. 724,711 filed Jan. 27, 1947, now U. S. Patent 2,462,527, can be coated in the same manner. In the case of photographic papers, the layer of alumina hydrate can also contain inert pigments, e. g., barium sulfate, calcium carbonate, and titanium dioxide. The Colour Index referred to above is that by F. M. Rowe "Colour Index", first edition January 1924, First Supplement 1928, published by the Society of Dyers and Colourists, Bradford, Yorkshire, England.

The invention is useful for the preparation of photographic elements for various purposes. Thus, it is useful in the preparation of motion picture and portrait film, lithographic film, printing plates, and photographic papers.

The invention can be used employing photographic film supports of various kinds; it can be used on cellulose derivative films, e. g., cellulose nitrate, cellulose acetate, cellulose propionate, cellulose acetate-propionate, cellulose acetate-butyrate; regenerated cellulose; superpolymers, e. g., polyvinyl chloride, polyvinyl fluoride, nylon; glass, metal, and the like.

An advantage of this invention is that it provides a simple method for gelling synthetic hydroxyl polymer-silver halide emulsion layers. No color or light-scattering property is imparted by the colloidal alumina hydrate and no undesirable photographic changes occur in the applied emulsion. The gelling action is rapid and the colloidal alumina hydrate has the added advantage of binding dyes to the polymeric layer so that they do not diffuse in washing or further photographic processing.

As many widely different embodiments of this invention can be made without departing from the spirit and scope thereof, it is to be understood that the invention is not to be limited except as defined by the claims.

What is claimed is:

1. A photographic element comprising a support bearing at least one light-sensitive silver halide layer and at least one stratum of a synthetic hydroxyl polymer having a plurality of recurring intralinear

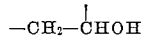

groups as polymer-forming units, said polymer having in contact therewith transparent colloidal alumina hydrate, said stratum of polymer being formed from an aqueous solution having a pH of 6–10.

2. A photographic element comprising a support bearing in order on at least one surface a thin layer of colloidal alumina hydrate and a layer of light-sensitive silver halides dispersed in a synthetic hydroxyl polymer having a plurality of recurring intralinear

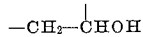

groups as polymer-forming units and formed from a solution having a pH of 7 to 9.

3. A photographic element comprising a support bearing in order on at least one surface a thin layer of colloidal alumina hydrate particles whose average size is from 30 to 60 millimicrons in their greatest axial dimension and a layer of light-sensitive silver halides dispersed in a synthetic hydroxyl polymer having a plurality of recurring intralinear

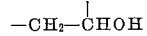

groups as polymer forming units formed from an aqueous solution having a pH of 7 to 9.

4. An element as set forth in claim 3 wherein the polymer is polyvinyl alcohol.

5. An element as set forth in claim 3 wherein the polymer is a polyvinyl alcohol acetal color former.

6. An element as set forth in claim 3 wherein the polymer is a hydrophilic hydrolyzed ethylene/vinyl acetate interpolymer.

7. The process which comprises depositing a thin sublayer of colloidal alumina hydrate on a support and coating an aqueous solution of a synthetic hydroxyl polymer having a plurality of recurring intralinear

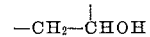

groups as polymer forming units and having a pH of 6 to 10 on said sublayer and drying the resulting coating.

8. The process which comprises depositing a thin sublayer of colloidal alumina hydrate particles whose average size is from 30 to 60 millimicrons in their greatest axial dimension from a colloidal solution on a film base and coating an aqueous dispersion having a pH of 7 to 9 of light-sensitive silver halides in a synthetic hydroxyl polymer having a plurality of recurring intralinear

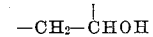

groups as polymer-forming units on said sublayer and drying the resulting film.

9. The process which comprises coating on a photographic film support a layer of light-sensitive silver halides and a separate layer of a dye each from an aqueous solution containing a synthetic hydroxyl polymer having a plurality of recurring

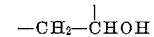

groups as polymer-forming units and containing colloidal alumina hydrate having an average particle size of 30 to 60 millimicrons in their greatest axial dimension.

CLAY WEAVER.

References Cited in the file of this patent

UNITED STATES PATENTS

| Number | Name | Date |
|---|---|---|
| 2,230,981 | Toland et al. | Feb. 4, 1941 |
| 2,249,536 | McDowell et al. | July 15, 1941 |
| 2,269,158 | Martinez | Jan. 6, 1942 |
| 2,413,570 | Krister et al. | Dec. 31, 1946 |
| 2,543,801 | Patterson et al. | Mar. 6, 1951 |